United States Patent [19]

Lawson et al.

[11] 4,059,560

[45] Nov. 22, 1977

[54] SMOKE AND FLAME RETARDED STYRENE POLYMERS

[75] Inventors: David Francis Lawson; Edward Leo Kay, both of Akron, Ohio

[73] Assignee: The Firestone Tire & Rubber Company, Akron, Ohio

[21] Appl. No.: 683,571

[22] Filed: May 5, 1976

[51] Int. Cl.² .......................... C08K 3/18; C08K 3/22; C08K 3/24
[52] U.S. Cl. .......................... 260/45.7 R; 260/2.5 FP; 260/892
[58] Field of Search .......... 260/42.13, 45.7 R, 2.5 FP, 260/892

[56] References Cited

U.S. PATENT DOCUMENTS

| | | | |
|---|---|---|---|
| 3,130,174 | 4/1964 | Lloyd et al. | 260/42.13 |
| 3,825,519 | 7/1974 | Murayama et al. | 260/42.13 |
| 3,862,070 | 1/1975 | Fukushima et al. | 260/28.5 A |
| 3,963,849 | 6/1976 | Thompson | 428/182 |

OTHER PUBLICATIONS

Dombrow, "Polyurethanes", 1965, pp. 12–17.
Stewart et al., Rubber Chem. and Tech., vol. 40, No. 1, Mar. 1975, pp. 132–139.
Mantle et al., Fire Technology, vol. 10, No. 3, Aug. 1974, pp. 201–210.

*Primary Examiner*—Donald E. Czaja
*Assistant Examiner*—R. A. White

[57] ABSTRACT

The evolution of smoke and the development of flame are retarded by the incorporation of hydrated magnesium oxychloride into organic polymers which contain aromatic components, particularly polymers and copolymers of styrene. The hydrated magnesium oxychloride has the added advantage that it has low tinting strength, i.e., does not greatly change the color or appearance of the polymers.

4 Claims, No Drawings

SMOKE AND FLAME RETARDED STYRENE POLYMERS

BACKGROUND OF THE INVENTION

Although styrenic and styrene-containing polymeric materials are adequate for many purposes, fire studies have shown that these materials could be improved with regard to two factors in flammability: (1) flame development and (2) smoke emission. A paper entitled "SMOKE GENERATION FROM THE BURNING OF POLYMERIC MATERIALS" given at the 32nd Annual Technical Conference of the Society of Plastic Engineers held at San Francisco in May, 1974 discussed this situation and the various additives which have been incorporated into styrene-containing polymers, and arrived at the conclusion that flame and smoke inhibition are, in many cases, mutually antagonistic. Another consideration in this field is the desirability of retaining the color, appearance, and mechanical properties of the polymeric material intact, while nevertheless inhibiting flames and smoke evolution in the polymer. Hydrated magnesium oxychloride has been used as a massive fire resistant coating on structures, and has been incorporated into neoprene foam as a flame and smoke inhibitor.

Accordingly, it is the purpose of this invention to provide compositions of aromatic group containing polymers which will be inhibited both against smoke evolution and also against flame. Also, from a marketing standpoint, it is the purpose of this invention to provide such compositions which will not be greatly altered in appearance, color, or physical properties from the uncompounded basic polymers contained therein.

SUMMARY OF THE INVENTION

Compositions of combustible polymers containing aromatic groups, and particularly those having a smoke density rating (Dmc) of 75 or more (using the NBS chamber as described below) are rendered smoke-inhibited and flame-resistant by the incorporation therein of a hydrated magnesium oxychloride. The color and appearance of the compositions are not deleteriously affected. The hydrated magnesium oxychloride may be used in amounts of 30-200 parts by weight per 100 parts of polymer.

The Aromatic Group Containing Polymers

The polymers which may be smoke and flame suppressed in accordance with this invention include any organic polymers containing a sufficient content of aromatic groups, say 10% or more, based on the weight of the polymers, so that, in the absence of the inhibiting material, they will have a Dmc rating of at least 75. Such polymers will include polystyrene and copolymers of styrene with other ethylenically unsaturated compounds copolymerizable therewith such as butadiene, acrylonitrile and the like, e.g., copolymers and block copolymers such as ABS, SBS, BSBS, SBR, SAN, etc., which contain repeating aliphatic or aromatic groups joined with aromatic units such as phenyl, biphenyl, dihydroxyphenyl, diphenyl sulfide, diphenyl sulfone, diphenyl ether, etc.; in general, polymers or polymer composites which contain aromatic groups, particularly resinous and rubbery polymers, cured or uncured.

The Hydrated Magnesium Oxychloride

This is a material containing the groups or compounds of magnesium oxide and magnesium chloride, together with variable amounts of water of hydration. The chemical formula may be written thus:

$$x\,MgO \cdot y\,MgCl_2 \cdot nH_2O$$

where:
  $x = 1\text{-}20$
  $y = 1\text{-}20$
  $n = 2\text{-}16$

This material may be simply prepared by mixing and stirring together an aqueous slurry of magnesium oxide and an aqueous solution of magnesium chloride until reaction is complete, and then recovering the product by filtration and drying.

THE TESTS CONDUCTED ON THE PRODUCTS OF THE INVENTION

National Bureau of Standards Smoke Density Chamber

Evaluations for the density of visible smoke were made using a commercial smoke density chamber modeled after one developed at the National Bureau of Standards by the Fire Research Group (see D. Gross, J. J. Loftus and A. F. Robertson, ASTM Special Technical Publication 422, pages 166-204 (1969).) This chamber contains a radiant heater producing 2.5 W/cm² of heat at the surface of a 3 × 3 inch sample, a propane-air pilot burner and a vertical beam of light with a photomultiplier tube detector and microphotometer to record the attenuation of light by smoke developing in the chamber. During smoke testing, the chamber is sealed to enclose the combustion products and smoke. The smoke developed is measured as Specific Optical Density, $D_S$, where $$D_S = (V/AL)\log_{10}(T_o/T) = 132\log_{10}(T_o/T)$$

$V$ = volume of chamber
$A$ = area of test specimen
$L$ = length of light path
$T_o$ = initial light transmittance through the chamber
$T$ = transmittance of light during test.

At the peak of smoke build-up $D_S = D_m$, and for purposes of the report, corrected maximum smoke is recorded as $D_{mc} = D_m - D_c$ where $D_c$ is the clear beam specific optical density occurring after the smoke test, when the chamber has been exhausted of smoke. Lower values of $D_{mc}$ indicate less obscuration of light due to smoke.

Several other quantities measured include the time in minutes to 90 percent of $D_m$ ($t\text{-}9\,D_m$) and the time (in minutes) to $D_S = 16$ ($tD_{16}$), which are indicative of the rate of smoke development (higher numbers signify slower rates). The definitions of terms are summarized below:

$D_{mc}$ = Specific optical density at maximum smoke intensity, corrected for fogging of lens seals. $D_{mc} <$ 25, light; 25-75, moderate; 100-400, dense; $> 400$ very dense.

$t\text{-}9\,D_m$ = time (minutes) to reach 90 percent of maximum optical density.

$tD_{16}$ = time (minutes) to D - 16; corresponds to early visibility obscuration. $tD_{16} < 1$, very fast; 1-3 fast; 4-6 moderate; 7-10, slow; $> 10$, very slow smoker.

Limiting Oxygen Index

LOI is the abbreviation of "Limiting Oxygen Index" which is defined as the minimum volume percent oxygen content required in an oxygen/nitrogen mixture to maintain combustion of a vertical, top-lighted test specimen. The value is expressed in mathematical terms as follows:

$$LOI = ([O_2]/[O_2] + [N_2]) \times 100$$

where $[O_2]$ is the concentration of oxygen and $[N_2]$ is the concentration of nitrogen. The LOI is considered to be a generally accurate, reproducible laboratory estimate of the relative flammability of materials. From a practical standpoint, an LOI value of greater than about 25 to 28 generally infers that the test specimen will be self-extinguishing in other small-scale tests. For a more detailed discussion of the LOI and method of determination, C. P. Fenimore and F. I. Martin's article in COMBUSTION AND FLAME 10 No. 2, page 135 (1966), should be consulted.

Limiting Oxygen Indices were obtained using the Michigan Chemical LOI apparatus. An Aminco-NBS smoke density chamber was used to obtain data on the rate of smoke generation as well as intensity of visible smoke.

PREPARATION OF HYDRATED MAGNESIUM OXYCHLORIDES USED IN THE EXAMPLES HEREINAFTER

Hydrated magnesium oxychlorides are generally prepared by treating magnesia with magnesium chloride in water, as noted above. Several hydrated magnesium oxychloride compositions were prepared in the laboratory for purposes of illustrating this invention. Others are available from commercial sources, with somewhat different contents of magnesium oxide, magnesium chloride and water.

| PREPARATION A | | |
|---|---|---|
| Part A | Magnesium oxide (MgO) | 61.0g (1.5 mole) |
|  | Water | 400 ml |
| Part B | Magnesium Chloride (MgCl$_2$ . 6H$_2$O) | 101.5g (0.5 mole) |
|  | Water | 400 ml |

A slurry of magnesium oxide was prepared from the ingredients of Part A, and a solution of magnesium chloride hydrate was prepared from the ingredients of Part B. The solution was slowly poured into the slurry with vigorous stirring at 25° C, and stirring was continued for 1 hour after addition. The resulting mixture was then filtered to remove water, and the solid product was air-dried for 16 hours, then dried in a forced-air oven at 100° C. for 24 hours. The product was ground to a fine powder before mixing with polymer, as described in the Examples hereinbelow.

The dried product weighed 89.5g and it had a chlorine content of 9.6 percent by weight. Upon calcination, the product lost 39–40% of its weight, indicating an approximate formula of 8.7 MgO . MgCl$_2$ . 16.4 H$_2$O.

| PREPARATION B | | |
|---|---|---|
| Part A | Magnesium Oxide (MgO) | 61g (1.5 mole) |
|  | Water | 900 ml |
| Part B | Magnesium Chloride Hexahydrate (MgCl$_2$ . 6H$_2$O) | 203g (1.0 mole) |
|  | Water | 500 ml |

The two parts were mixed as described in Preparation A, with stirring continued for 30 minutes after addition. The mixture was then allowed to stand for 4 hours, and was filtered to remove water from the suspension. The filter cake was air-dried for 3 days, then dried in an oven at 100° C to constant weight. The dried product weighed 97g; it had a chlorine content of about 7.8 percent by weight, and it lost about 40 percent of its weight upon calcination. This indicated an approximate formula of 11 MgO . MgCl$_2$ . 20 H$_2$O. The product was powdered before application in the polymer.

EXAMPLE I

|  | Parts by weight |
|---|---|
| High impact polystyrene ("Styron 475", a product of Dow Chemical Company) | 100 |
| Calcium Stearate | 2 |
| Flame & Smoke Retarding Agent (Hydrated magnesium oxychloride or other, per Table I) | 67 |

A series of compositions was made up in accordance with the above formulation, using the magnesium oxychloride as above prepared, and also, for comparison, other flame and smoke retarding agents in the several compositions as set forth in Table I. In each preparation, the polystyrene, the calcium stearate, and the flame and smoke retarding agent selected for that run were combined on a roll mill at 280°–290° F (138°–143° C), sheeted off, and molded into appropriate test specimens in a compression mold at 325° F (162° C). The specimens for smoke tests were of nominal 0.03 inch thickness, with other dimensions noted above. The specimens were then subjected to the smoke and flame generation tests as outlined above under "Tests" and the results are tabulated herewith.

TABLE I

| Type of Smoke and Flame Retardant | National Bureau of Standards Smoke Density Chamber Test | | | Oxygen Index Determination | | Run No. |
|---|---|---|---|---|---|---|
|  | Dmc | t.9Dm | tD16 | LOI | LOI, % Increase Over Control |  |
| Hydrated Magnesium* Oxychloride | 210 | 1.88 | 0.94 | 28.0 | 47 | 1 |
| Aluminum Hydroxide | 224 | 1.69 | 0.75 | 23 | 22 | 2 |
| Silica (325 Mesh) | 228 | 1.34 | 0.49 | 21.0 | 11 | 3 |
| None | 385 | 1.33 | 0.3 | 19.0 | — | 4 |

TABLE I-continued

| Type of Smoke and Flame Retardant | National Bureau of Standards Smoke Density Chamber Test | | | | Oxygen Index Determination | | Run No. |
|---|---|---|---|---|---|---|---|
| | Dmc | t.9Dm | tD16 | LOI | LOI, % Increase Over Control | | |
| Control | | | | | | | |

*Prepared as described in "Preparation A".

From the table, it will be seen that the maximum smoke density (Dmc) for the hydrated magnesium oxychloride of this invention (Run No. 1) was on a par with this figure for the other additives (Runs 2 and 3) in polystyrene. The time required for smoke generation was more protracted (t·9Dm and tD16) for the hydrated magnesium oxychloride as compared to the others. In addition, the limiting oxygen index (LOI), which is an index of flame resistance, was increased far more in the presence of the hydrated magnesium oxychloride than was the case with the other additives. The color and appearance of the specimen of Run No. 1 containing hydrated magnesium oxychloride was very little changed in comparison with the unpigmented control, specimen of Run No. 4.

| | Parts by Weight |
|---|---|
| Styrene-butadiene rubber ("FRS-1502" a product of The Firestone Tire & Rubber Company) | 100 |
| Zinc Oxide | 2 |
| Stearic Acid | 2 |
| Sulfur | 2 |
| N(t-butyl) mercaptobenzothiazole sulfenamide | 1 |
| Flame and smoke retarding agent (Magnesium oxychloride or other per Table II) | 67 or 150 (Per Table II) |

A series of compositions was made up in accordance with the above recipe, using the hydrated magnesium oxychloride and other different additives in the several runs, and also varying the amounts of these materials, all as set forth in Table II. In each case, the ingredients in the order listed above, were mixed in a Brabender mixer, milled on a two-roll laboratory mill, and then molded and cured at 300°–325° F (149°–162° C) for 25 minutes to provide appropriately shaped test specimens as in the previous example. There were then subjected to the smoke and flame tests as described above under "Tests". The results are set forth herewith in Table II.

These results show that, with respect to maximum smoke density (Dmc), the hydrated magnesium oxychloride (Runs No. 1 & 2) is comparable to aluminum hydroxide (Runs No. 3 & 4) and magnesium hydroxide (Runs No. 5 – 7). The magnesium oxychloride also appears to be on a par with the other materials as regards time required for smoke generation (t·9Dm, tD16). However, the outstanding feature of the magnesium oxychloride is its increase in the oxygen index of these samples, indicating its superior fire retardant character. Again, the color and appearance of the specimens of Runs No. 1 & 2, containing hydrated magnesium oxychloride, were very little changed in comparison with the appearance of the unpigmented control specimen of Run No. 8.

It is understood that the foregoing descriptions are given by way of illustration, and that variations in the type of styrene polymer composition which is prepared and the exact formula of hydrated magnesium oxychloride which is used may be made without departing from the spirit of this invention. For example, some grades of hydrated magnesium oxychloride comprising lower ratios of magnesium oxide to magnesium chloride which can be made commercially, can be substituted for the materials used in the examples.

What is claimed is:

1. A smoke and flame inhibited composition containing (a) 100 parts by weight of a polymeric material selected from butadiene-styrene elastomer, high impact polystyrene, polystyrene and copolymers of styrene with a monoethylenically unsaturated nitrile, (b) 30–200 parts hydrated magnesium oxychloride per 100 parts said polymer, said copolymer containing at least 10% by weight aromatic groups derived from styrene.

2. A composition according to claim 1 wherein said polymeric material is high impact polystyrene.

3. A composition according to claim 1 wherein said polymeric material is butadiene-styrene elastomer.

4. A composition according to claim 1 wherein said polymeric material is polystyrene.

TABLE II

| Flame and Smoke Retardant | | National Bureau of Standards Smoke Density Chamber Tests | | | Oxygen Index Determination | | Run No. |
|---|---|---|---|---|---|---|---|
| Type | Parts Used | Dmc | t.9Dm | tD16 | LOI | LOI, % Increase Over Control | |
| Hydrated Magnesium Oxychloride* | 67 | 318 | 1.50 | 0.39 | 22.5 | 25 | 1 |
| | 150 | 181 | 2.7 | 0.9 | 28.5 | 58 | 2 |
| Aluminum Hydroxide | 67 | 282 | 1.07 | 0.41 | 22.5 | 25 | 3 |
| | 150 | 205 | 2.55 | 1.05 | 25.5 | 42 | 4 |
| Magnesium Hydroxide | 67 | 274 | 1.40 | 0.46 | 22.0 | 22 | 5 |
| | 150 | 136 | 2.08 | 1.02 | 26.0 | 44 | 6 |
| | 150 | 172 | 2.62 | 0.84 | 26.5 | 47 | 7 |
| None | 0 | 377 | 0.87 | 0.32 | 18.0 | — | 8 |

*Prepared as above described in "Preparation B"